United States Patent [19]

Buller et al.

[11] 3,924,654

[45] Dec. 9, 1975

[54] QUICK DISCONNECT TANK COUPLER

[75] Inventors: Joseph S. Buller; Arthur A. Eneim; David A. Hitzelberger, all of Santa Barbara, Calif.

[73] Assignee: Hughes Aircraft Company, Culver City, Calif.

[22] Filed: Dec. 26, 1973

[21] Appl. No.: 427,968

[52] U.S. Cl. .............. 137/322; 251/149.4; 285/316
[51] Int. Cl.² ........................................ F16K 43/00
[58] Field of Search ..... 137/317, 322, 329.1, 329.3, 137/613, 614.02, 614.03, 625.68; 251/149, 149.1, 149.6, 297, 321, 339, 354, 149.4; 285/277, 316

[56] References Cited
UNITED STATES PATENTS

| | | | |
|---|---|---|---|
| 1,088,847 | 3/1914 | Sutton | 285/277 |
| 2,361,866 | 10/1944 | Norway | 251/149.4 X |
| 2,935,338 | 5/1960 | Mills, Jr. | 285/277 X |
| 3,076,671 | 2/1963 | Freeman | 285/277 |
| 3,093,357 | 6/1963 | Rodgers et al. | 251/149.4 |
| 3,144,237 | 8/1964 | Zurit et al. | 251/149.6 |
| 3,155,402 | 11/1964 | Cornelius | 285/277 X |
| 3,186,745 | 6/1965 | Lyles | 285/277 X |
| 3,406,942 | 10/1968 | Bocceda | 251/149.4 |
| 3,545,479 | 12/1970 | Lee | 137/625.68 X |
| 3,567,255 | 3/1971 | Evans | 285/277 X |
| 3,613,726 | 10/1971 | Torres | 137/614.03 |
| 3,704,002 | 11/1972 | Skarzynski | 251/149.6 |

FOREIGN PATENTS OR APPLICATIONS

| | | | |
|---|---|---|---|
| 636,814 | 2/1962 | Canada | 251/149.6 |

*Primary Examiner*—Henry T. Klinksiek
*Attorney, Agent, or Firm*—Paul H. Ware; W. H. MacAllister

[57] ABSTRACT

A high-pressure, quick-disconnect valve coupling operating in the range of fluid pressures in the order of or greater than 8,000 pounds per square inch is disclosed. The device features a multiposition manually operated control knob which is keyed to a cam and by means of which the various operating modes are obtained. The "Load" mode, for example, is the only position of the knob in which a tank may be connected to the valve and the "Eject" mode is the only position in which a tank may be removed from the valve. Two other positions provided in one embodiment of the invention are the "OFF" and "ON" positions. The "OFF" position provides a gas tight seal on an actuator needle while also sealing the actuator mechanism to the tank. The "ON" position causes the actuator needle to unseat a ball check thus allowing tank gas to enter the actuator mechanism and pass to a receiving system. The device is intended for use in cooling systems to supply, for example, cryogenic cooling fluids stored under high pressure. The valve provides a safe foolproof method of very quickly attaching and detaching extremely high pressure tanks without the use of tools and with only thumb or finger pressure on its single actuating knob.

5 Claims, 8 Drawing Figures

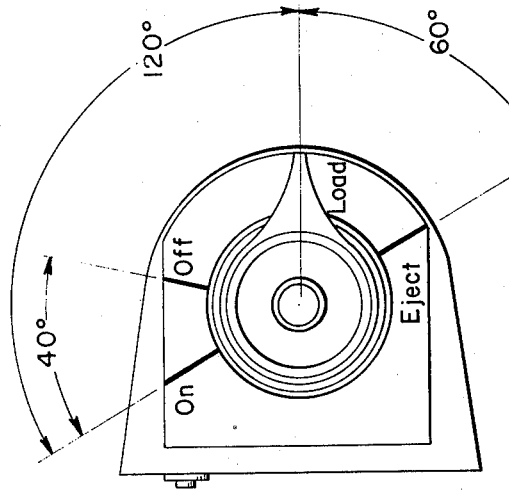
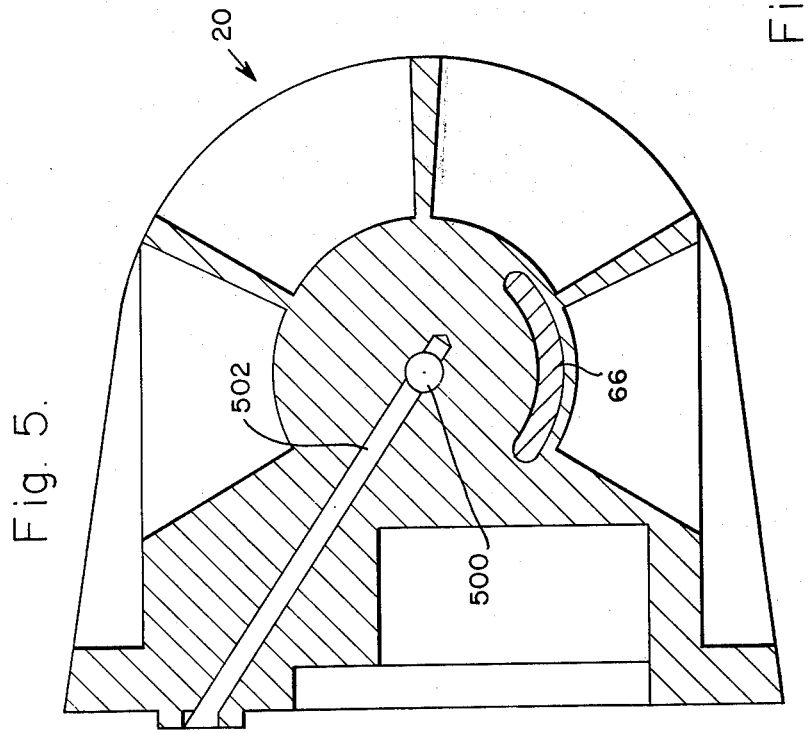
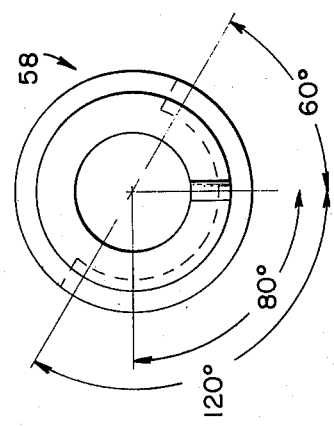
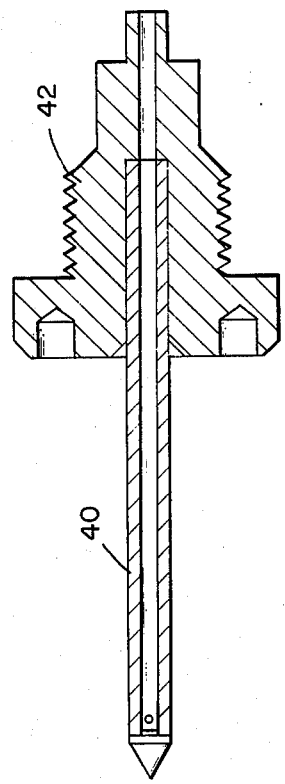

QUICK DISCONNECT TANK COUPLER

BACKGROUND OF THE INVENTION

1. Field of the Invention

This invention relates to apparatus for handling and using cooling fluids and more particularly to the manipulating of those cryogenic fluids stored in tanks under very high pressures.

2. Description of the Prior Art

Conventional removable valves generally require considerable manual force for operation and usually are comparatively bulky. Most of them cannot be safely uncoupled under pressure. It is also to be noted that quick disconnect features in these valves are accompanied by an attendant spillage problem that becomes increasingly aggravated at elevated pressures, that is, above 5,000 pounds per square inch. There is a growing need, particularly in the applications of supply of cryogenic fluids to user systems, for valves operating at higher pressures than conventionally and that operate reliably under reduced manual force. It is also to be desired that such a device allow coupling and decoupling to a high pressure source of such fluids without leakage. It would be an advantage to the art if a light weight, compact device were available to provide a safe and reliable method of quickly coupling and decoupling a user system to very high pressure tanks, of the order of 8,000 pounds per square inch and above, without attendant spillage of the fluid under pressure.

SUMMARY OF THE INVENTION

It is an object of the present invention to provide a combination high pressure tank valve, quick disconnect coupling and actuator permitting safe and rapid changing of pressurized tanks.

It is a further object of the invention to provide an apparatus for controlling gas flow operating at pressures of the order of 8,000 pounds per square inch.

It is also an object of the invention to provide a combination high pressure tank valve, quick disconnect coupling and actuator operable without tools and with moderate manual force required for operation.

A still further object of the invention is to provide a combination high pressure tank valve, quick disconnect coupling and actuator in a low weight package with a minimum number of parts.

A combination high pressure tank valve, quick disconnect coupling and actuator according to the invention includes a multiposition operating selector knob by means of which the various modes of operation may be selected. In the "Load", or connecting position, a tank may be connected to the actuator mechanism. The "Load" position is the only position in which a tank will be accepted by the actuator. Once the tank is so connected it cannot be removed until the selector knob is turned to the "Eject", or remove position. When the selector knob is returned to the "Load" position after having been in the "On", or valve open position, such operation of the selector knob causes residual pressure to be bled out of the actuator mechanism while the tank is still firmly retained. When the selector knob is in either the "Load" or the "Eject" position and the tank is in place connected to the actuator mechanism, tank pressure is not incident to the actuator. Moving the selector knob to the "Off", or valve closed position causes the actuator to be securely sealed to the tank, however, tank sealing and hence tank pressure are not disturbed in this position. Advancing the selector knob to the "On" position allows the tank gas to enter the actuator for distribution to the system. Returning the selector knob to the "Off" position allows resealing of the tank and cuts off the supply of gas to the actuator.

Additional objects, advantages and characteristic features of the present invention will become readily apparent from the following detailed description of preferred embodiments of the invention when considered in conjunction with the accompanying drawings.

BRIEF DESCRIPTION OF THE DRAWING

FIG. 5 is a sectional view taken as indicated from FIG. 3 and illustrating the gas passage out of the actuator.

FIG. 6 is a longitudinal cross section of the needle assembly showing the plug at the tip of the hollow needle.

FIG. 7 is a plan view showing the positions of the actuator knob.

FIG. 8 is an end view of the cam to which the actuator knob is keyed and by means of which the device performs its various functions.

DESCRIPTION OF THE PREFERRED EMBODIMENTS

Figure 1:
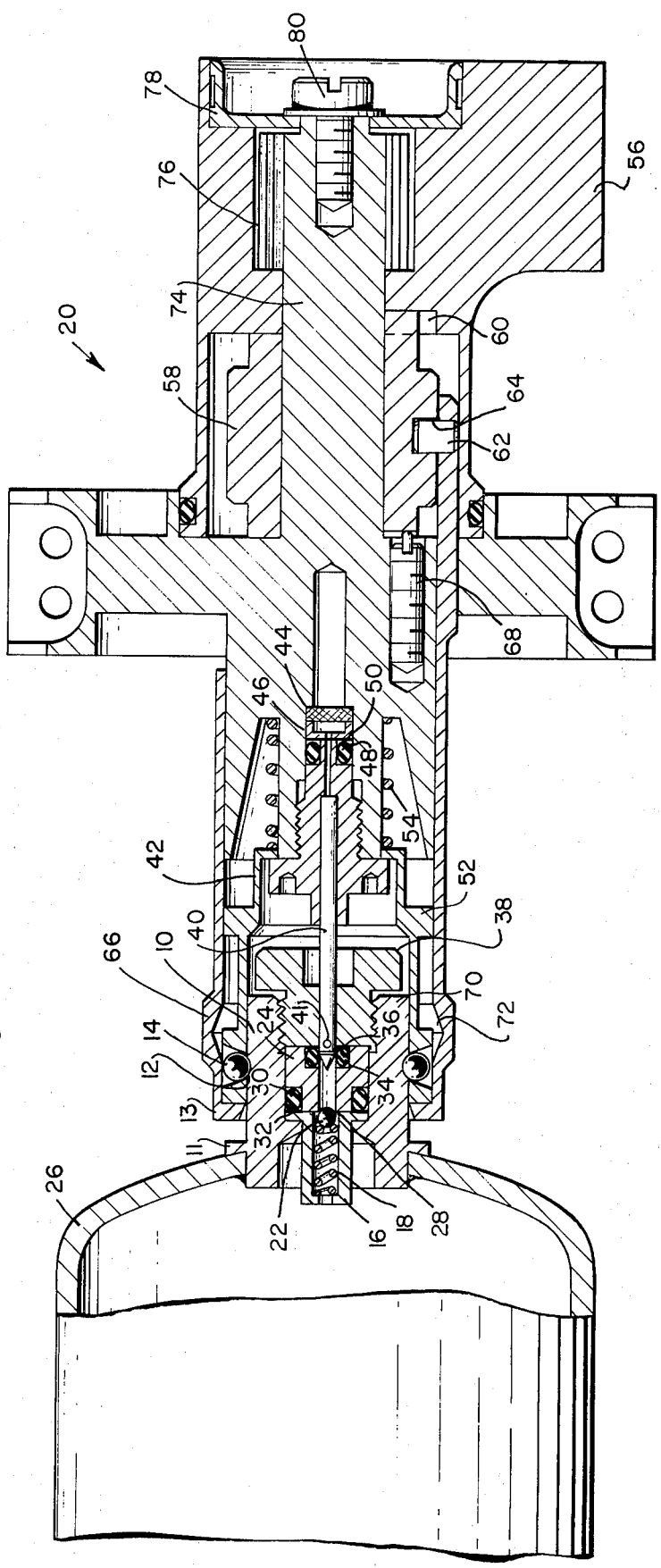
FIG. 1 is a longitudinal cross section of the device illustrating the relationship of the parts with the actuator knob in the "Load" position.

Referring to FIG. 1 with greater particularity, the essential functional parts of the device are shown in longitudinal cross section. The tank neck 10 provides a groove 12 to fit the balls 14 which retain the tank neck 10 in the actuator mechanism indicated generally as 20. Mounted in the tank neck 10 are the ball retainer 16 and spring 18. Spring 18 serves to provide initial engagement of the ballcheck 22 with the ball seat adapter 24. Seating of the valve at high pressure is produced by gas pressure in tank 26 forcing the ball 22 against the seat 28. The ball seat adapter 24 is sealed in the tank neck 10 by the O-ring seal 30 and plastic backup ring 32 and contains O-ring seal 34 and backup ring 36 which is the only movable seal. The above mentioned parts are retained by the fitting 38 and ready access is thereby permitted to the seals for purposes of installation or replacement. An important feature of the ball seat adapter 24 is that it is removable and replaceable. The seat surface is therefore easily lapped to a smooth surface.

The hollow needle 40 has a cross drilled hole 41 near the tip as also can be seen in FIG. 6. The needle assembly 42 seals in the tank 26 allowing the hollow needle 40 to actuate the ball valve 22. A particle filter 44, its retainer 46, O-ring 48 and backup ring 50 filter the gas from the tank 26 and seal the passage into actuator 20. The gas passage out of the actuator 20 is connected to the inlet passage by a hole which is illustrated at 500 in FIG. 5, drilled at an angle so that no plugging of cross-drilled holes is required as in much of the prior art. The ball retainer sleeve 52 and spring 54 are also retained by the needle assembly 42.

Manual operation is by means of an actuator knob 56 which is keyed to a barrel cam 58 by means of key 60. The actuator knob 56 is illustrated in further detail in FIG. 7, and an end view of the barrel cam 58 is shown in FIG. 8 for further clarity. A pin 62 rides in a helical slot 64 in the cam 58 and pushes or pulls the sleeve 66. Sleeve 66 is cut at one end thereof so as to leave the arcuate extension which includes pin 62. The knob 56 is constrained against axial movement and keyed to barrel cam 58 by key 60 so that rotation of the knob 56 causes rotation of the barrel cam 58 constrained by helical slot 64 and mating pin 62 thus causing axial motion of sleeve 66. This results in a relative movement between the sleeve 66 and the needle 40. A detent 68 matches two notches in the face of the cam 58 which, with the two closed ends of the cam, provides four operating positions.

Referring still to FIG. 1, and with reference also to FIG. 7 the apparatus is shown in the "Load" position with the tank neck 10 already loaded and retained. When a tank 26 is loaded into actuator 20, the nose 70 of tank 26 first contacts balls 14 which force ball retainer sleeve 52 to compress spring 54 until the balls 14 pass over tank neck 10 by entering groove 72 in sleeve 66. When the balls 14 fall into the neck groove 12 and tank 26 is released, spring 54 forces tank 26 and balls 14 to the position illustrated in FIG. 1 and the tank 26 is retained by actuator 20. In this "Load" position the collar 11 on the tank neck 10 engages the end of the sleeve 66 before the needle 40 lifts the ball 22 off its seat 28 so the tank pressure cannot be released by pushing the tank 26 into the actuator mechanism 20.

Figure 2:
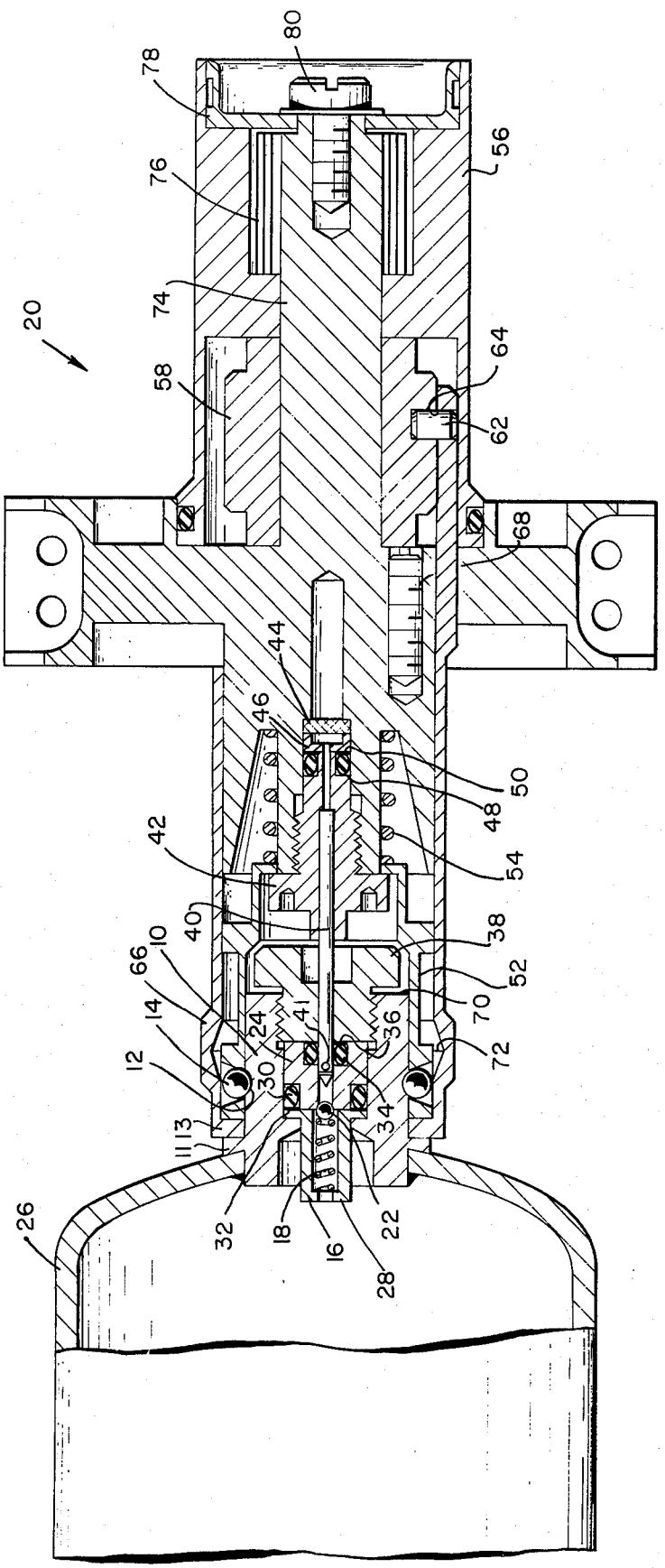
FIG. 2 is a longitudinal cross section of the device illustrating the relationship of the parts with the actuator knob in the "OFF" position.

Referring now to FIG. 2 with reference also to FIG. 7 the "Off" position is illustrated. Advancing knob 56 to this position pulls tank 26 and its O-ring 34 over the cross-drilled hole in needle 40 thereby sealing the actuator 20 to tank 26.

Figure 3:
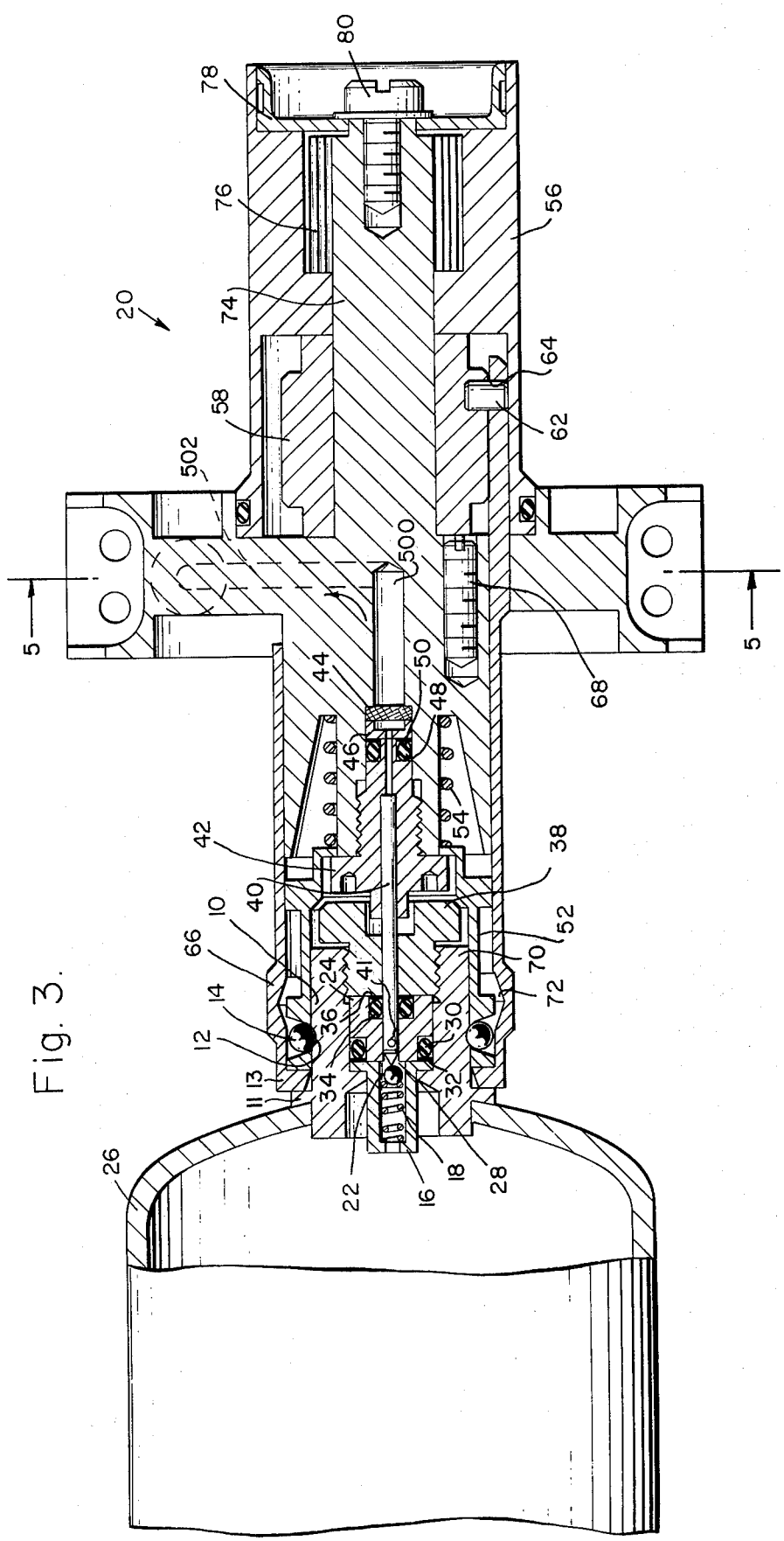
FIG. 3 is a longitudinal cross section of the device illustrating the relationship of the parts with the actuator knob in the "ON" position.

Referring now to FIG. 3 with reference also to FIG. 7, the "On" position is illustrated. Advancing knob 56 still further to the "On" position causes the tip of needle 40 to push ball check 22 off its seat 28 so that gas contained under pressure in tank 26 is allowed to enter actuator 20 and pass into the system via passage 500 and into passage 502 as illustrated by the arrows in FIG. 3. In the "On" position the ball sleeve 52 has fully compressed spring 54 and is against the actuator base 74 so that tank neck 10 is fully retained and cannot be released. Returning knob 56 to the "Off" position allows ball check 22 to seat while retaining the gas tight O-ring seal 34 on needle 40. Thus it can be seen that the relative movement between sleeve 66 and needle 40 seats and unseats ball 22.

Figure 4:
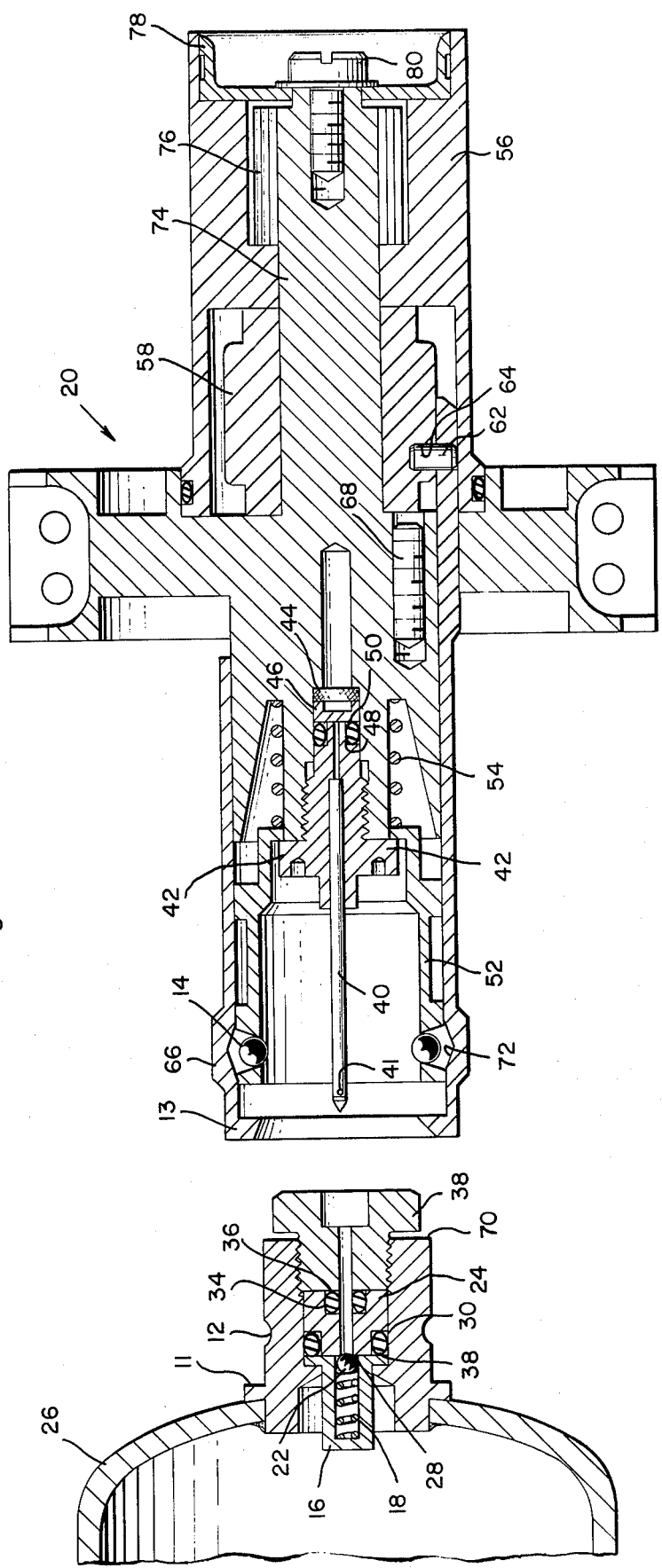
FIG. 4 is a longitudinal cross section of the device illustrating the relationship of the parts with the actuator knob in the "EJECT" position.

Referring now to FIG. 4 the "Eject" position is illustrated. It is to be understood that, in this position, the tank neck may be inserted and removed from within the sleeve 66. The illustration of FIG. 4 shows the tank neck in a removed position for purposes of clarity. The action of knob 56 going from the "Load" to the "Eject" position in withdrawing hollow needle 40 from O-ring seal 34 allows the small amount of fluid between the ball check 22 and O-ring seal 34 to be vented through the tank neck. Returning knob 56 past the "Load" and to the "Eject" position, the groove 72 in sleeve 66 is over the balls 14 so that they are released from tank neck groove 12 and the tank 26 may be removed. Releasing knob 56 allows spring 76, retained by cap 78 and screw 80, to return knob 56 to the "Load" position. Removal of screw 80 and needle assembly 42 permit complete disassembly of actuator 20 without other tools.

Thus, there has been described a high pressure tank valve, quick disconnect coupling and actuator which provides for safe rapid changing of tanks while pressurized. The apparatus features low weight, compactness and a minimum of parts plus the added advantage of allowing complete disassembly with a minimum of tools.

Although the invention has been shown and described with reference to particular embodiments, nevertheless, various changes and modifications obvious to a person skilled in the art to which the invention pertains are deemed to lie within the purview of the invention.

What is claimed is:

1. In a high pressure fluid coupling device including a high pressure tank, the combination comprising
a high pressure valve means in said tank, said valve means being normally seated by pressure in said tank;
an actuator mechanism removably connected to said tank, said actuator mechanism comprising
an outer sleeve;
means for removably securing and sealing one end of said sleeve to said tank substantially adjacent said high pressure valve means;
means within said sleeve for unseating said valve means;
cam means coupled to said sleeve at the other end thereof for axially moving said sleeve so as to provide relative movement between said sleeve and said means for unseating said valve means;
means connected to said cam for manually positioning said cam means in a plurality of preselected positions for securing said sleeve to said tank and for seating and unseating said valve means; and
an outlet passage through said actuator and said means for unseating said valve means.

2. The coupling device of claim 1 wherein said high pressure valve means comprises a ball check valve, and said means for unseating said valve comprises a hollow needle.

3. The coupling device of claim 1 wherein said cam means comprises
a rotatable helical slotted cam constrained against axial movement; and
a pin connected to said other end of said sleeve and mated with said helical slot.

4. The coupling device of claim 1 wherein said means connected to said cam for manually positioning said cam comprises
a knob having an indicator finger,
an indicia plate adjacent said knob having position indicating means thereon,
a channel on said knob, and a key on said cam for mating with said channel.

5. The fluid coupling device of claim 1 wherein said means connected to said cam means for position said cam means comprises
a knob keyed to said cams, said knob having preselected positions for seating and unseating said valve while said sleeve is secured and sealed to said tank.

* * * * *